United States Patent
Stadter et al.

(10) Patent No.: US 6,721,658 B2
(45) Date of Patent: Apr. 13, 2004

(54) INTEGRATED NAVIGATION AND COMMUNICATION SYSTEM FOR USE IN DISTRIBUTED SPACECRAFT SYSTEMS

(75) Inventors: Patrick A. Stadter, Mt. Airy, MD (US); William S. Devereux, Mt. Airy, MD (US)

(73) Assignee: The Johns Hopkins University, Baltimore, MD (US)

(*) Notice: Subject to any disclaimer, the term of this patent is extended or adjusted under 35 U.S.C. 154(b) by 55 days.

(21) Appl. No.: 10/172,018

(22) Filed: Jun. 14, 2002

(65) Prior Publication Data

US 2002/0190163 A1 Dec. 19, 2002

Related U.S. Application Data

(60) Provisional application No. 60/298,210, filed on Jun. 14, 2001.

(51) Int. Cl.⁷ .......................... G01C 21/24; G06F 19/00
(52) U.S. Cl. ................. 701/213; 342/357.06; 439/620; 439/94; 709/227; 709/217; 370/282; 370/277
(58) Field of Search ................. 701/200, 213, 701/215; 342/357.12, 357.13, 357.06; 439/608, 620, 485, 487, 94; 455/427, 13.2; 361/709, 704, 720; 709/238, 227, 217; 716/16; 174/35 R, 35 C, 252; 244/176; 370/281, 282, 280, 277

(56) References Cited

U.S. PATENT DOCUMENTS

| | | | |
|---|---|---|---|
| 5,711,677 A | * 1/1998 | Mui et al. | 439/64 |
| 6,072,433 A | 6/2000 | Young et al. | 342/386 |
| 6,195,037 B1 | * 2/2001 | Gross et al. | 342/354 |
| 6,208,625 B1 | * 3/2001 | Zancho et al. | 370/316 |
| 6,275,475 B1 | * 8/2001 | Emmons, Jr. | 370/276 |
| 6,298,289 B1 | * 10/2001 | Lloyd et al. | 701/13 |
| 6,323,980 B1 | * 11/2001 | Bloom | 398/129 |
| 6,356,448 B1 | * 3/2002 | DiBene et al. | 361/721 |
| 6,407,722 B1 | * 6/2002 | Bogner et al. | 343/906 |

OTHER PUBLICATIONS

Interspacecraft Communications Architectures for Formation Flying, AIAA Space Tech. Conf. and Expor., Sept. 28–30, 1999, PA Stadter, WS Devereux, RA Denissen, DJ Duven, MS Asker, DA Weidow, and DC Folta.

* cited by examiner

*Primary Examiner*—Thomas G. Black
*Assistant Examiner*—Ronnie Mancho
(74) *Attorney, Agent, or Firm*—Albert J. Fasulo, II (57) ABSTRACT

An integrated navigation and communication system that enables distributed spacecraft system operations. The system is a modular, extensible system that supports science operations among multiple, distributed spacecraft by implementing the essential functions of navigation, communication and control. Distributed spacecraft systems, also called formation flying systems, extend the capabilities of single-spacecraft missions by providing a platform for complex sensing tasks, including multipoint observation, co-observation, and distributed apertures. To accomplish these tasks, the system enables spacecrafts within a distributed spacecraft system to communicate science and coordination information, to determine relative position, velocity and time for command and control operations, and to operate in a coordinated manner to achieve common mission goals.

19 Claims, 9 Drawing Sheets

INTEGRATED NAVIGATION AND COMMUNICATION SYSTEM FOR USE IN DISTRIBUTED SPACECRAFT SYSTEMS

CROSS-REFERENCE TO RELATED APPLICATION

This application claims priority from Provisional Application No. 60/298,210 filed on Jun. 14, 2001 entitled "Crosslink Transceiver for Integrated Navigation and Communication among Multiple, Distributed Spacecraft", the contents of which are hereby incorporated by reference.

STATEMENT OF GOVERNMENTAL INTEREST

This invention was made with Government support under contract NAG5-10562 with the National Aeronautics and Space Administration. The Government has certain rights in this invention.

BACKGROUND OF THE INVENTION

1. Field of the Invention

The present invention relates generally to satellite communication and navigation and, in particular, to an integrated navigation and communication system for use in distributed spacecraft systems.

2. Description of the Related Art

Distributed spacecraft systems (e.g., distributed satellite systems or spacecraft systems with some type of propulsion device) use multiple spacecraft to augment the capabilities of monolithic space system approaches. These systems, also referred to as formation flying systems, enable complex sensing tasks such as, for example, distributed aperture processing, co-observation, multipoint observation, and distributed interferometry, which are beyond the abilities of single spacecraft systems. Depending on the degree of inherent coordination, formation-flying systems differ from traditional satellite constellations in that the distributed system is treated as a whole, unified by common objectives. Both the National Aeronautics and Space Administration (NASA) and the Department of Defense (DoD) have identified distributed spacecraft system as a means to achieve mission goals in future deployments. NASA, for example, has identified campaigns of several space missions that largely rely on multiple spacecraft deployments. Operationally, however, such systems are in their infancy.

A significant number of Earth and space science goals rely on the successful deployment and operation of distributed spacecraft technology within future operational missions. In conjunction with fundamental science, distributed spacecraft military missions in support of defense operations have been identified as important capabilities to maintain national interests.

The specific advantages attributed to the use of distributed spacecraft systems include increased capability, gradual performance degradation in that failure of one of the spacecraft does not render the system obsolete, improved system robustness, and cost efficiency. Relative to single spacecraft systems, formation-flying systems provide improved capability by spatially disbursing sensors, thereby supporting extended and adaptive baselines for distributed sensing tasks. This approach also supports temporal sampling at variable resolutions and is a systematic mechanism for implementing space-based multi-sensor data fusion systems. Because capability is distributed among multiple spacecraft such as satellites, re-deploying functioning spacecraft can mitigate failures that impact individual spacecraft. Thus, while performance in terms of resolution or coverage of a target area may be reduced due to diminished spacecraft, basic functionality is retained. Compensating for failures in this manner allows distributed spacecraft systems to realize an improved level of robustness beyond that of a single spacecraft approach. Finally, the goal of cost-efficiency is embodied in the fact that such formation flying systems rely on the collective faculties of multiple, individually limited spacecraft. This often necessitates the use of small, economical spacecraft approaches that can be deployed in clusters to reduce launch costs.

Realizing the advantages of distributed spacecraft systems, however, entails considerable complexity in system design and implementation. It is not simply by virtue of the fact that multiple spacecrafts may be deployed that advantageous performance, capability, robustness, or cost efficiencies can be achieved. For coordinated formations, particularly autonomous or coherent distributed spacecraft systems, technologies and methodologies must provide mechanisms to support information exchange, coordination, autonomy, and dynamic adaptivity. The ability to realize such characteristics in a system must be greater than or commensurate with the level of coordination that is desired within the formation. For example, a loosely coupled, non-coherent system may only require crosslink communications to exchange state information or support health and status sharing among spacecraft. Alternatively, a coherent system designed to act as a distributed aperture (e.g., a virtual spacecraft with distributed elements) would require a considerably higher level of distributed control, precision navigation, precision differential timing, and high-rate crosslink communications for coordination and science data exchange.

Supporting collective systems operations, coordination, and science among distributed spacecraft necessitates functionality in navigation, communications, and control that leverage complex interactions among spacecrafts and between spacecrafts and the operating environment. Therefore, a need exists for a system that addresses these functions in an integrated, modular manner and that provides a structured approach to distributed spacecraft system design and implementation to effectively realize the advantages of such a system.

SUMMARY OF THE INVENTION

It is, therefore, an object of the present invention to provide a system that enables spacecrafts within in a distributed spacecraft system to communicate science and coordination information to determine relative position, velocity and time for command and control operations, and to operate in a coordinated manner to achieve common mission goals (e.g., interferometry, co-observation, implementing a synthetic sensing aperture, multipoint observation, etc.).

The above and other objects are achieved by providing an integrated navigation and communication system contained within a spacecraft, that enables control operations and science operations in a distributed spacecraft system including multiple spacecraft, comprising: a stackable connector utilized as a system bus; at least one processor card; at least one Global Positioning System (GPS) receiver card; at least one crosslink receiver card for receiving signals from other spacecraft in the distributed spacecraft system; and at least one crosslink transmitter card for transmitting signals to the other spacecraft in the distributed spacecraft system; wherein the at least one processor card, the at least one GPS receiver card, the at least one crosslink receiver card, and the at least one crosslink transmitter card are in communication with each other by each being connected to the stackable connector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Preferred embodiments of the present invention will be described herein below with reference to the accompanying drawings. In the following detailed description, well-known functions or constructions are not described in detail as they would obscure the invention in unnecessary detail.

Figure 1:
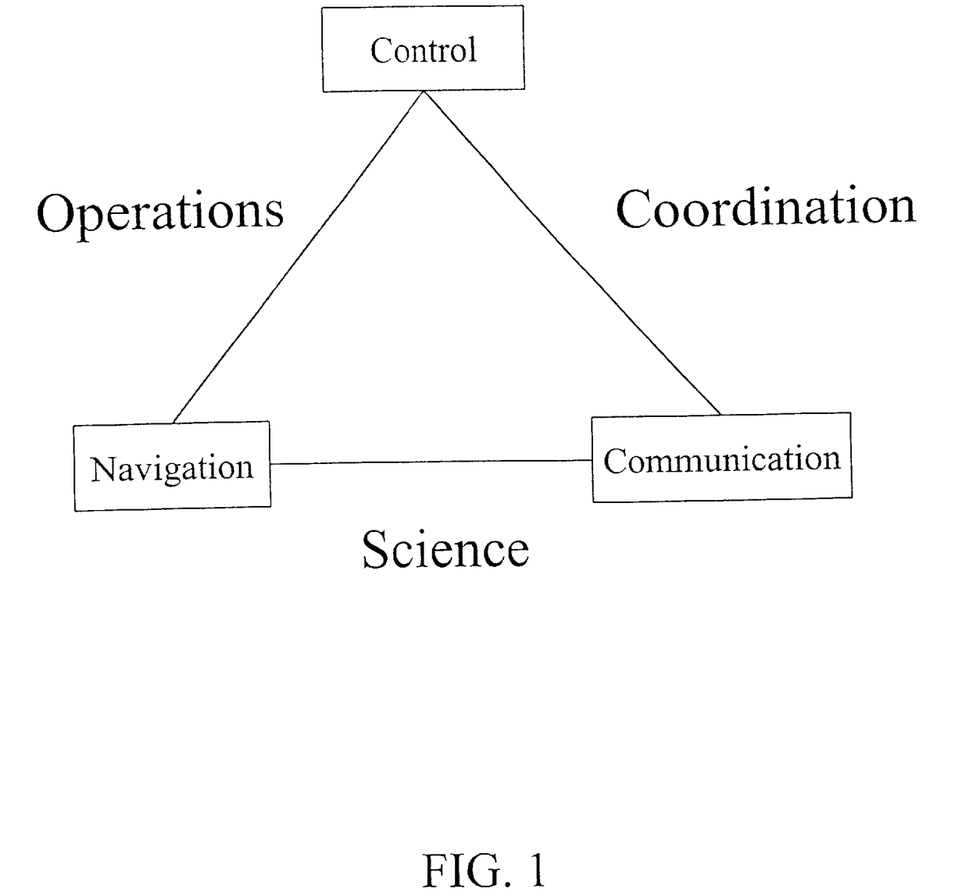
FIG. 1 is a conceptual model of the present invention illustrating the interdependence of system functionality and the capabilities that those functions support.

FIG. 1 is a conceptual model of the present invention illustrating the interdependence of system functionality and the capabilities that those functions support. The coordination of distributed autonomous systems such as formation flying spacecraft is typically defined as control in conjunction with communication among non-co-located spacecraft. Coordination is achieved by the perception of the system state and the identification of events that impact that system state. As a distributed system, coordination requires both local and global knowledge and thus communication of applicable information among spacecraft is vital. Control, in conjunction with navigation, forms the foundation for system operations needed to take advantage of the distribution of spacecraft.

Because a basic motivation for deploying distributed spacecraft systems is the ability to support and adapt the spatial dissemination of sensors, such systems require knowledge of spacecraft state as well as generated control actions to effect state changes. Performing scientific tasks also requires the ability to communicate information among spacecraft for on-board processing such as, for example, data alignment, data correlation, and data fusion.

Figure 2:
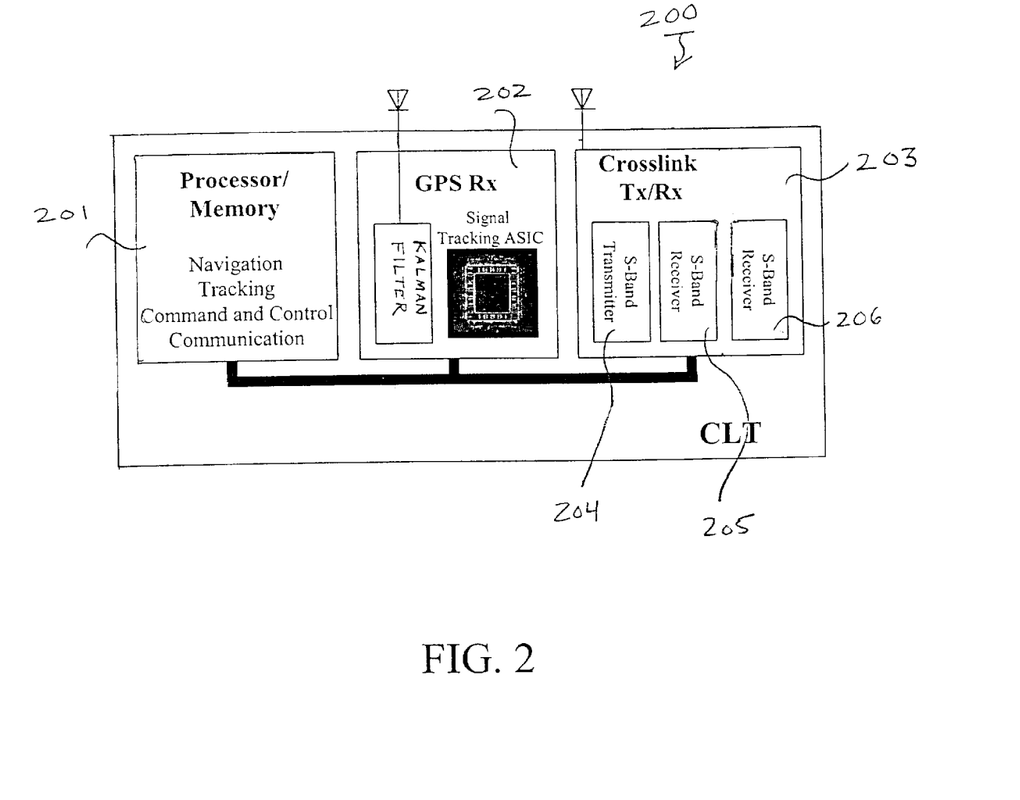
FIG. 2 is a block diagram illustrating an integrated navigation and communication system for multiple distributed spacecraft flying in formation.

FIG. 2 is a block diagram illustrating an integrated navigation and communication system 200 for multiple distributed spacecraft flying in formation, hereinafter referred to as a Crosslink Transceiver (CLT), according to an embodiment of the present invention. As such, the CLT directly supports the implementation of the fundamental functions required to enable distributed spacecraft systems, including absolute and relative navigation, interspacecraft communications, and autonomous event detection for distributed command and control. Relative navigation, a fundamental measurement for data alignment and data correlation among distributed spacecraft, is determined through a variety of methods to support broad classes of formation flying missions. Depending on mission requirements, straightforward relative navigation solutions are generated by differencing filtered absolute GPS solutions. More rigorous requirements can be met through relative GPS Kalman filtering, both aided and unaided by crosslinks for performance enhancements (e.g., using the crosslink and GPS signals to estimate the local ionosphere), and through direct crosslink ranging. The latter ranging methodology provides a solution for distributed spacecraft systems operating in deep space or otherwise beyond the GPS constellation. In this mode and without an external absolute reference, crosslink communication and ranging among distributed spacecraft supports determination of the formation's relative geometry modulo a rigid body rotation. The CLT is a modular scalable system that can be augmented to provide integrated support of additional functionality such as uplink/downlink capability and reflected GPS processing for various tasking, such as sea state assessment, altimetry, and target identification.

As illustrated in FIG. 2, in an exemplary configuration/embodiment, the CLT provides three core functions: processor/memory 201, GPS reception 202, and crosslink communications 203. The processor 201 supports signal acquisition and tracking, navigation, communications, and distributed command and control for space spacecraft. A preferred component for the CLT's GPS reception 202 is a flight-qualified design based on the NASA Thermosphere Ionosphere Mesosphere Energetics and Dynamics (TIMED) GPS Navigation System (GNS). It provides autonomous orbit determination and navigation based on an extended Kalman filter. The third functional element of the CLT is the crosslink communications module 203, consisting of a crosslink transmitter 204 and multi-channel crosslink receiver. In FIG. 2, the multi-channel crosslink receiving is accomplished by two receivers 205 and 206. Nominal crosslink frequencies are in S-band, however the design facilitates reconfiguration for alternative frequency bands.

The CLT of the present invention is an enabler of broad classes of distributed spacecraft systems. This is in contrast to the typical technology development approach of adapting single-spacecraft technology for multiple spacecraft systems. Therefore the CLT incorporates characteristics that facilitate distributed spacecraft system operations through the implemented navigation, communication, and control mechanisms. These characteristics include:

a modular, configurable design in a physically minimized format;

a scalable system design in terms of communications architecture, computing power, and navigation capability;

power control for interference mitigation and reduced power consumption; and a variable rate crosslink communications channel.

A. Crosslink Transceiver Modularity

Figure 3:
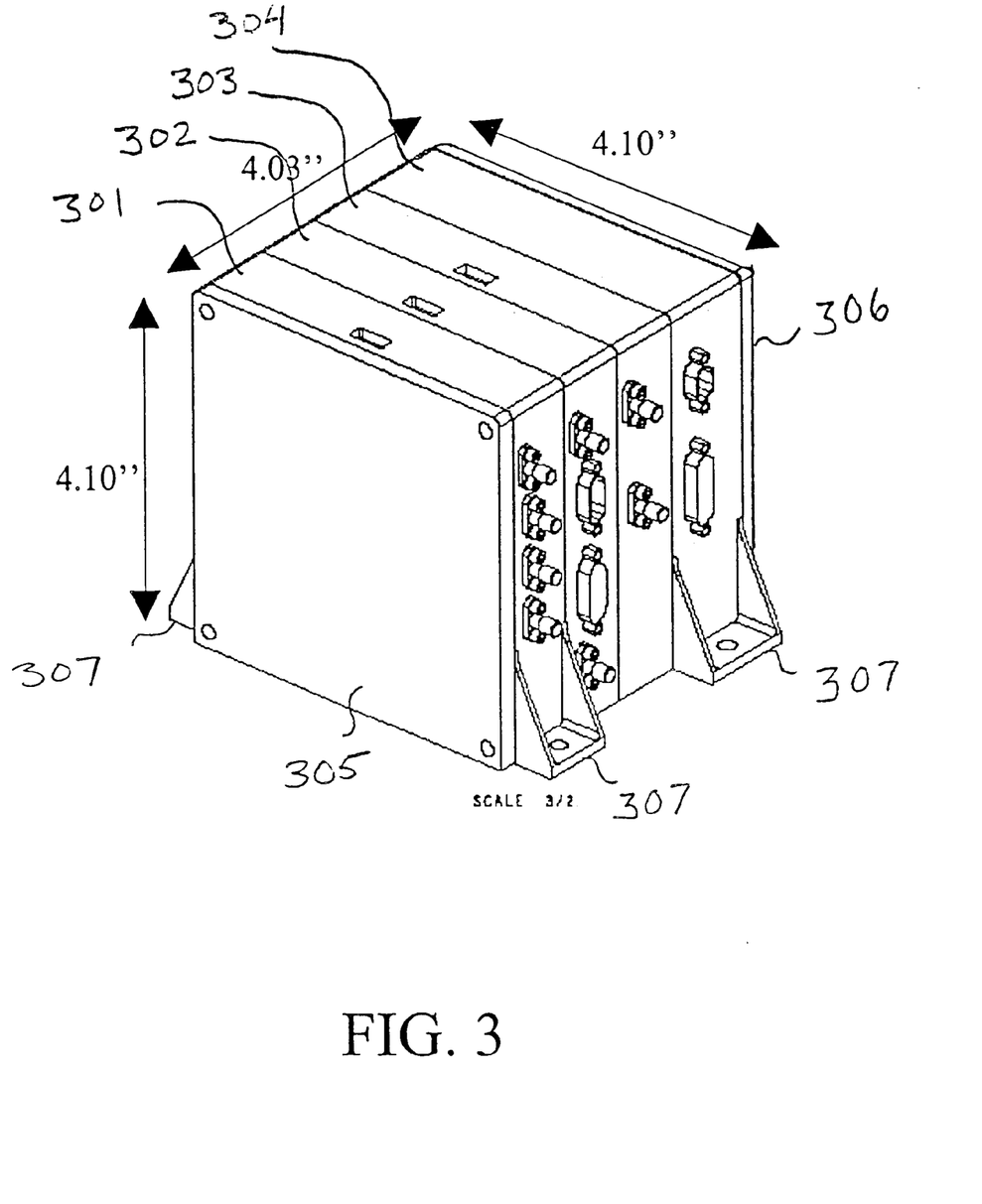
FIG. 3 is a diagram illustrating a design of a preferred embodiment of the present invention.

FIG. 3 is a diagram illustrating a design of a preferred embodiment of a CLT. The CLT design allows the system to be configured for a broad range of distributed spacecraft system missions. This is realized by implementing the functional aspects of the CLT as individual, stackable cards 301–304 with an integrated shell in a nominal 4"×4" form factor. A stackable, 152-pin connector provides a system bus (not shown in FIG. 3, but illustrated in FIGS. 4, 5, and 7), the nature of which can be defined for a specific implementation or by imposition of a standard protocol. The system is typically implemented as a stand-alone unit, with an integrated chassis formed by attached end-caps 305 and 306 to those cards 301 and 304 positioned at the ends of the unit.

Figure 4:
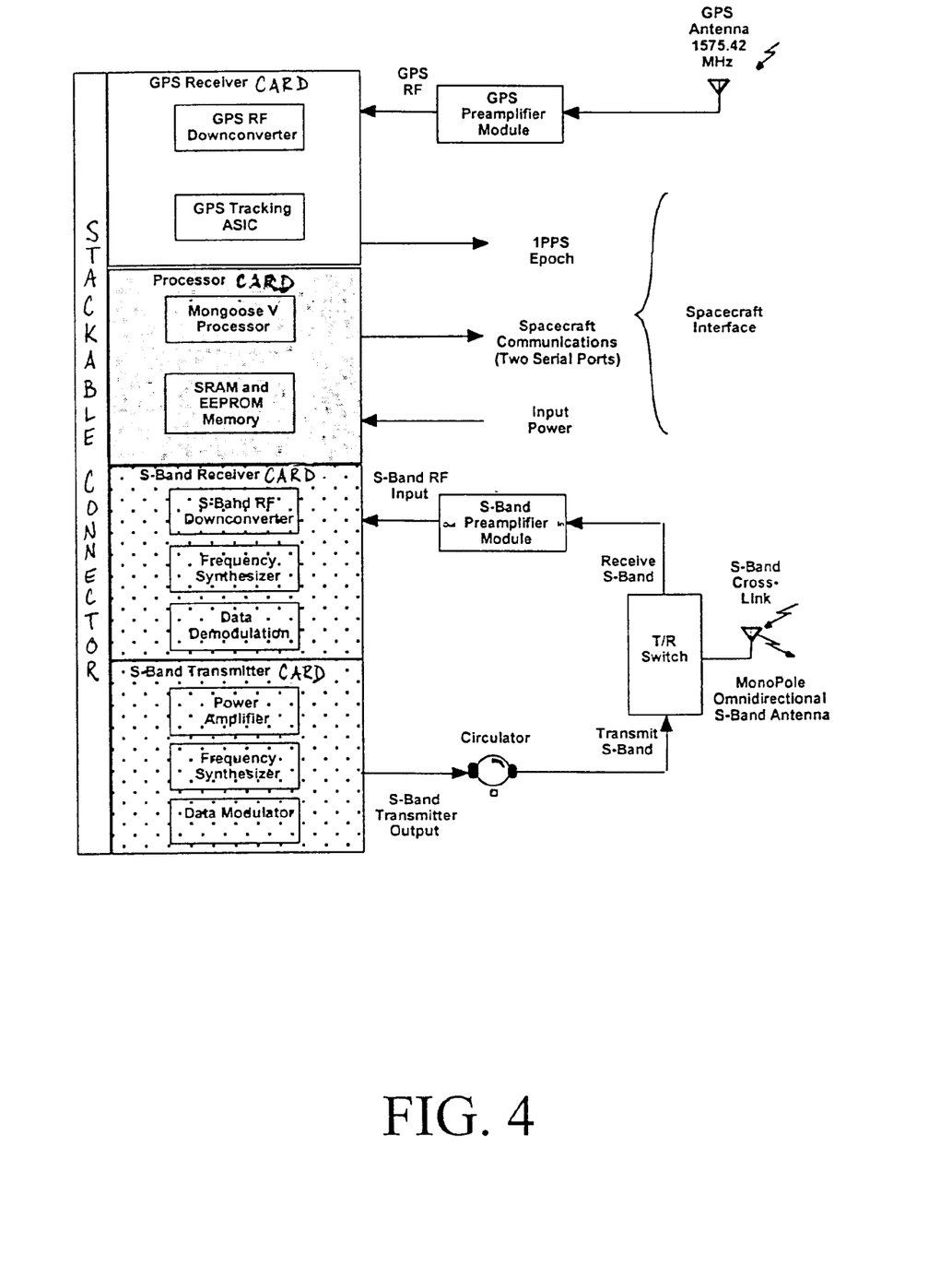
FIG. 4 is a schematic diagram illustrating a preferred embodiment of the present invention.
Figure 5:
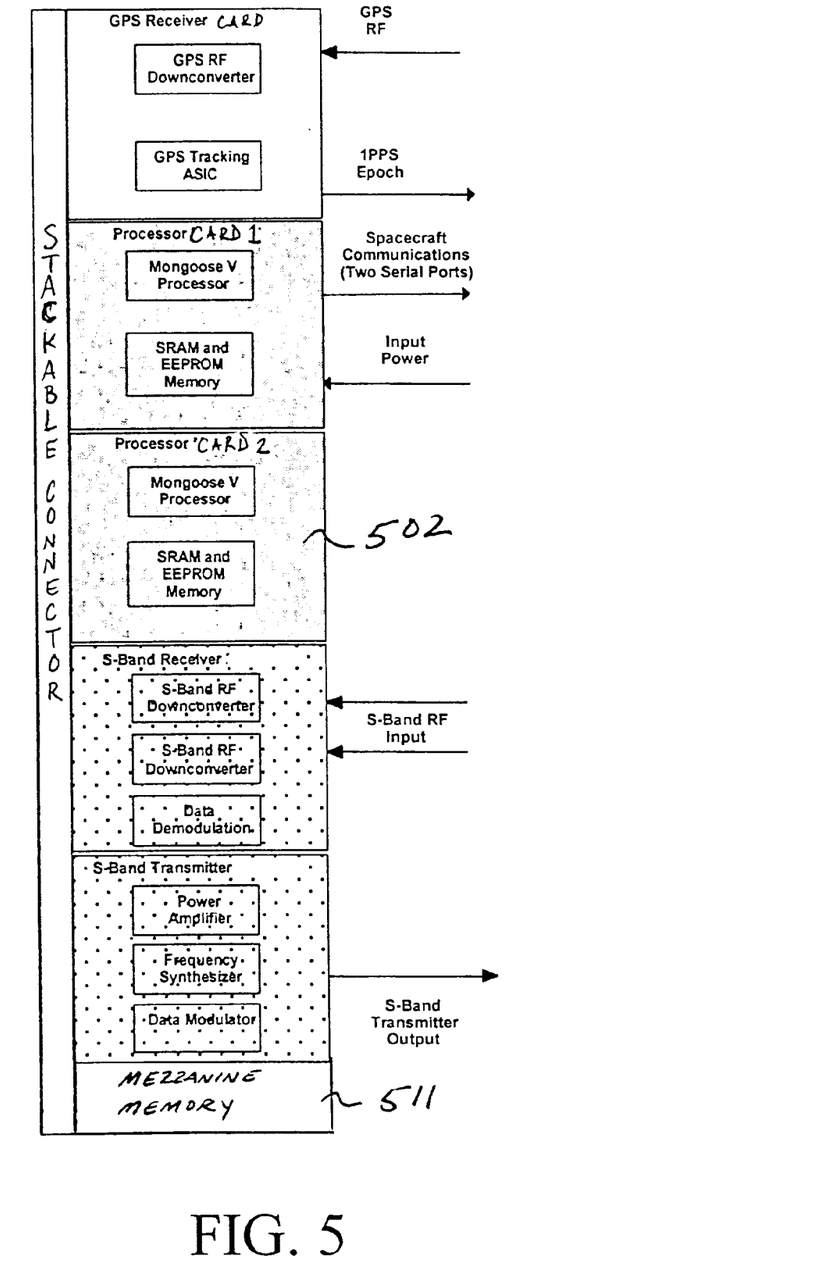
FIG. 5 is a schematic diagram illustrating an alternate embodiment of the present invention.

Given the modularity of the design of the CLT system, many possible combinations of cards can be implemented to construct a specific CLT. However, a preferred embodiment of a standard CLT implementation consists of four cards: a GPS receiver card 401, a processor card 402, crosslink receiver card 403, and a crosslink transmitter card 404, as illustrated in FIG. 4. Reconfiguring the system to meet the needs of a specific application is achieved by building a chassis through selection of the proper cards needed to support the functions of the target system. For example, a flight qualified GPS Navigation System consists of a processor card and a GPS receiver card. Alternatively, if a particular mission requires additional processing power, multiple processor cards can be stacked to support scientific functions or computationally intensive precision navigation and differential time estimation. This configuration is illustrated in FIG. 5, which includes an additional processor card 502 for illustration purposes.

Modularity extends to individual cards, in addition to the CLT design as a whole. For example, the processor card can be customized for a specific application through the use of a field-programmable gate array. In addition, a built in stackable connector provides access to a mezzanine memory board 511 that supports multiple memory configurations that can be adapted for a given implementation.

B. Crosslink Transceiver Packaging

As stated above, the CLT design utilizes an advanced electronic packaging approach with a stackable connector, which also acts as a system bus. Referring again to FIG. 3, each 4"×4" card 301–304 is attached to a frame (not shown) to meet system vibration requirements, and the multiple cards 301–304 are stacked to form a stand-alone chassis with the addition of end-caps 305 and 306. A typical card is populated on the primary and secondary sides. The stackable connector is realized by a press-fit connector that acts as the unit backplane.

As a stand-alone unit, the CLT chassis provides thermal conductivity through footings mounted to selected cards and in thermal contact with spacecraft structure. A wide range of thermal dissipation can be achieved by regulating the number of cards that are configured with footings and all cards can be configured for heat dissipation through footings. FIG. 3 illustrates the use of these footings in a four-card configuration. In this configuration, sufficient thermal dissipation is achieved by the use of footings 307 on the two end cards 301 and 304.

Figure 8:
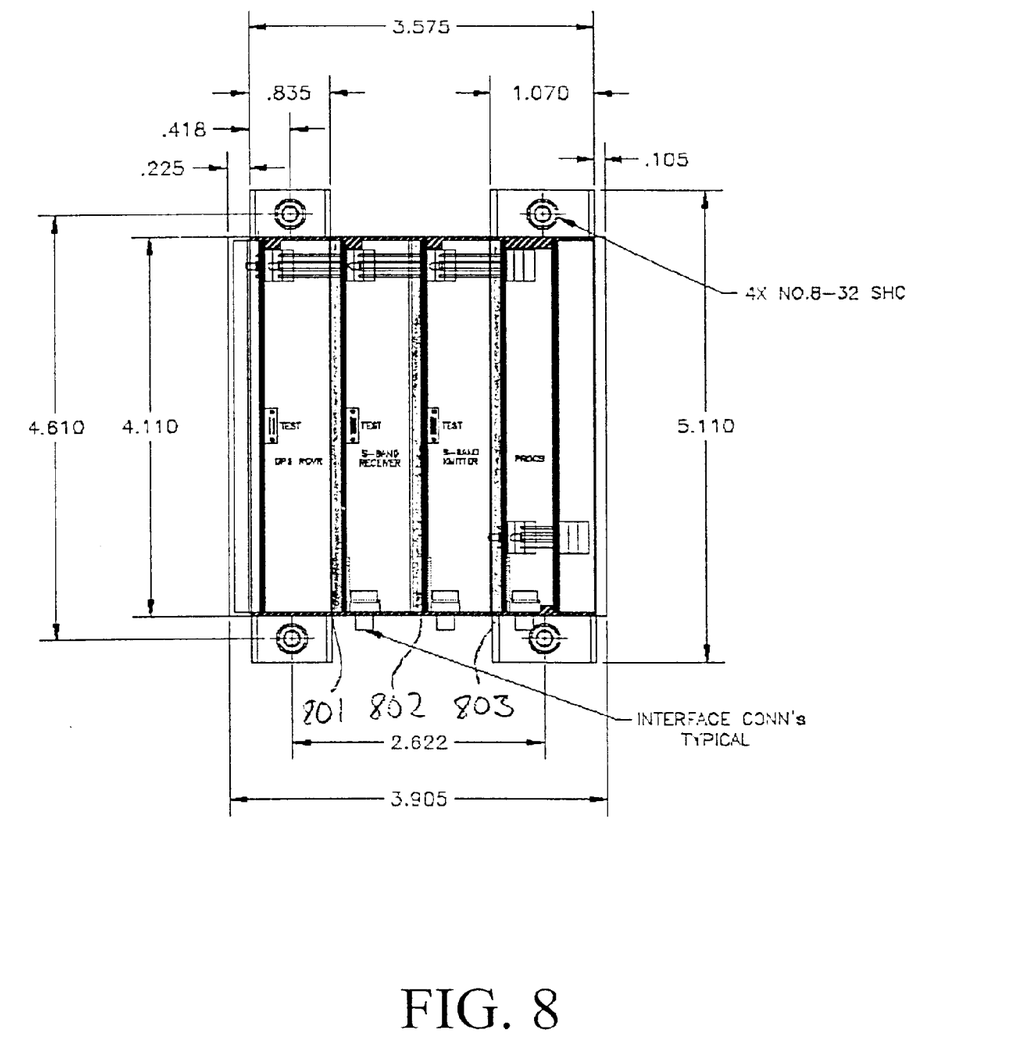
FIG. 8 is a diagram illustrating a design of a preferred embodiment of the present invention.

The design illustrated in FIG. 3 and FIG. 8 is highly conducive to electromagnetic interference (EMI) mitigation among cards. EMI is mitigated by appropriately positioning sensitive cards and by incorporating isolation plates 801–803 between interfering cards.

C. Crosslink Transceiver Scalability

Distributed spacecraft systems require mechanisms through which multiple spacecraft (i.e., spacecrafts) can interact to achieve mission objectives. This fact necessitates technology solutions that scale sufficiently to support operations on the missions in which they are deployed. This includes multiple access techniques to realize communications connectivity for information exchange among spacecraft, crosslink connectivity to support relative ranging measurements, and sufficient aggregate computing power among all spacecraft to achieve mission objectives. Therefore the ability to provide scalable functionality in support of a range of mission classes is critical to achieving cost-efficiencies through re-use and application of cross-cutting technology.

To support scalable communications connectivity for multiple mission classes, the CLT can be operated in a half-duplex time division multiple access mode (TDMA) or in a full-duplex hybrid frequency division multiple access/code division multiple access (FDMA/CDMA) mode. The ability to support a TDMA mode is particularly applicable for small formations (e.g., 3–4 spacecrafts) that do not require full-duplex communications. Scalability is achieved by managing time slices for transmit and receive operations among spacecraft. However, limitations due to available time slots and throughout reductions inherently limit this approach. From an implementation perspective, the technique whereby communications channel scalability is achieved has a significant impact on hardware design. Cognizance of this is particularly important for small spacecraft designs that are mass, volume, and power limited.

Using CDMA techniques minimizes crosslink hardware requirements because it allows reception from multiple sources using common radio frequency (RF) front-end hardware and multiple channel tracking and data recovery can be accomplished using a common processor. However, for simultaneous crosslink transmission and reception for a given spacecraft, sufficient isolation between the transmit signal and receive signal must be achieved. This can be challenging because of the large dynamic range of signal power that is encountered in typical distributed spacecraft systems. Even postulating benign relative dynamics among spacecraft, the evolution of a formation during an orbit and during mission life can result in a significant range of received crosslink signal power, and isolation requirements may be on the order of 150 dB or more. Using a common carrier, this amount of isolation is typically impractical using pure CDMA techniques.

Therefore, in a preferred embodiment, to support a scalable number of spacecrafts and to achieve sufficient isolation, the CLT uses a hybrid FDMA/CDMA technique. Preferably, each crosslink receiver card in the CLT supports two frequency channels. Therefore, one manner in which scalability is achieved is by adding and tuning additional receiver cards to support available frequency channels in the allowable space-to-space bands. This is appropriate for moderately sized formations (e.g., 2–6 spacecrafts).

However, the hybrid FDMA/CDMA technique also supports significantly greater scalability for large formations (e.g., 7 or more spacecrafts) by taking advantage of the fact that the CLT is designed to support the canonical command and control architectures: centralized, hierarchically distributed, and fully distributed. Specifically, by implementing large formations with hierarchically distributed architectures that consist of small, dynamic sub-clusters configured in a star communications topology, the CLT can provide needed scalability.

Figure 6:
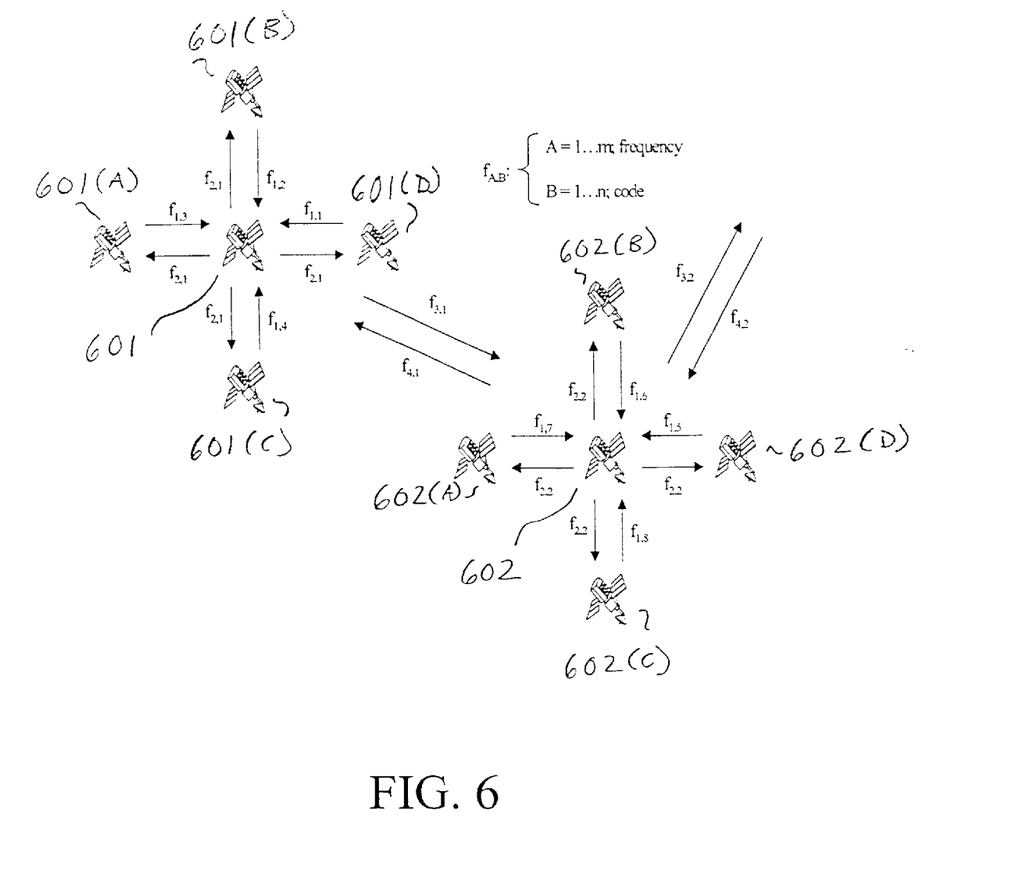
FIG. 6 is a diagram illustrating dynamic sub-clusters configured in a star communications topology.

FIG. 6 is a diagram illustrating dynamic sub-clusters configured in a star communications topology. In FIG. 6, the star topology consists of base or hub spacecrafts 601 and 602, and their associated client spacecraft, 601(*a*)–601(*d*) and 602(*a*)–(*d*), respectively. Using these moderately sized subclusters and distinct transmit and receive frequency channels ($f_A$) in conjunction with unique codes ($f_B$) for client spacecraft, simultaneous full-duplex communications between the bases 601 and 602 and each client, 601(*a*)–601(*d*) and 602(*a*)–602(*d*), can be established. Each base broadcasts to all clients simultaneously using one frequency channel and each client uses the other frequency channel to communicate back to the base. At the base, CDMA techniques are applied to distinguish client communication channels. Use of separate transmit and receive frequency channels provides the means to achieve necessary isolation between transmitter and receiver, and additional frequency channels and code allocations can be used for exchanges among subclusters (e.g., among bases 601 and 602) within the hierarchically distributed system.

D. Crosslink Transceiver Power Control

As described above, considerable complexity in tracking and recovering crosslink signals within distributed spacecraft systems exist due to the large dynamic range of signal powers that are received during operations. In addition, the use of CDMA signal structures to support communications and ranging results in the well-known near-far interference problem. Near-far interference is a form of multiple access interference (MAI) in which the effective received carrier to noise power density ($C/N_0$) ratio from a remote transmitter is reduced due to interference of the signal from a transmitter that is in close proximity to the receiver. Consequently, the maximum operating range between a transmitting spacecraft and a receiving spacecraft is a function of formation geometry and varies with time. Thus, this form of multiple access interference not only adds complexity to the distributed spacecraft system's communication technology, but also impacts the operating range of spacecraft in the formation.

In a preferred embodiment, the CLT provides a solution to the challenge of near-far interference by implementing dynamically adjustable power attenuation in the crosslink transmitter. A straightforward methodology can be implemented in which the received power level is controlled to provide a minimum $C/N_0$ to satisfy the pseudo-random code tracking and data recovery bit error rate requirements. This significantly improves the operating range of distributed spacecraft relative to uncontrolled signal power and also simplifies systems engineering considerations because of the predictability of the operating range.

It should be noted that, depending on the amount of power control implemented in a given crosslink communication/navigation system, it is necessary to dynamically adapt the code and phase tracking loops. This is a result of varying signal power that is received and variations in the data rate requirements of a distributed spacecraft system, as described hereinbelow. Even with power control, initialization of the power control method and initial signal acquisition requires the ability to adapt the signal acquisition loops to the received power level.

In addition to mitigating MAI, power control in the CLT has the added advantage of reducing average power consumption, a fundamental issue for distributed systems comprised of power-limited spacecraft. Due to inherent transmitter inefficiencies, significant power savings can be achieved by transmitting at the minimum required power level. Without power level control, the amount of radiated power must be scaled for minimum antenna gains and maximum range; however, because average operations do not consistently occur at these extremes, adaptive power control can significantly impact system operations. For example, for a spacecraft operating at half the maximum required operating range and experiencing an antenna gain of 4 dB above the minimum, transmitted power consumption can be reduced by approximately 10 dB. This improvement in average power consumption can be the difference between operating and idling other spacecraft subsystems in a power-limited system The CLT also supports power optimization through the ability to dynamically adapt processor power consumption. Under low-utilization conditions, the CLT processor board autonomously reduces the processor clock rate for power savings.

E. Crosslink Transceiver Variable Rate Communications

In the preferred embodiment, the CLT supports variable data rates on the crosslink communications channels to address the dynamic variations in received signal power during distributed spacecraft systems operations as identified in previous subsections. The ability to autonomously adjust the crosslink data rate is particularly important for distributed spacecraft systems during initialization of the formation, when relative positions of other spacecrafts are largely unknown and the variance of any estimates is large.

Because many distributed spacecraft systems rely on omni-directional crosslink antenna patterns to reduce pointing requirements and to improve operational robustness, dynamic data rate adaptation addresses antenna gain issues caused by shadowing or antenna nulls while maintaining bit error rate requirements. The ability to adapt the crosslink data rate is of particular importance in the presence of augmented high-rate data channels. In this instance, the CLT uses a low-rate channel for ranging and as a pilot for a high-rate crosslink channel; therefore reducing the low-rate channel to the minimum possible level to provide improved operating range.

Figure 7:
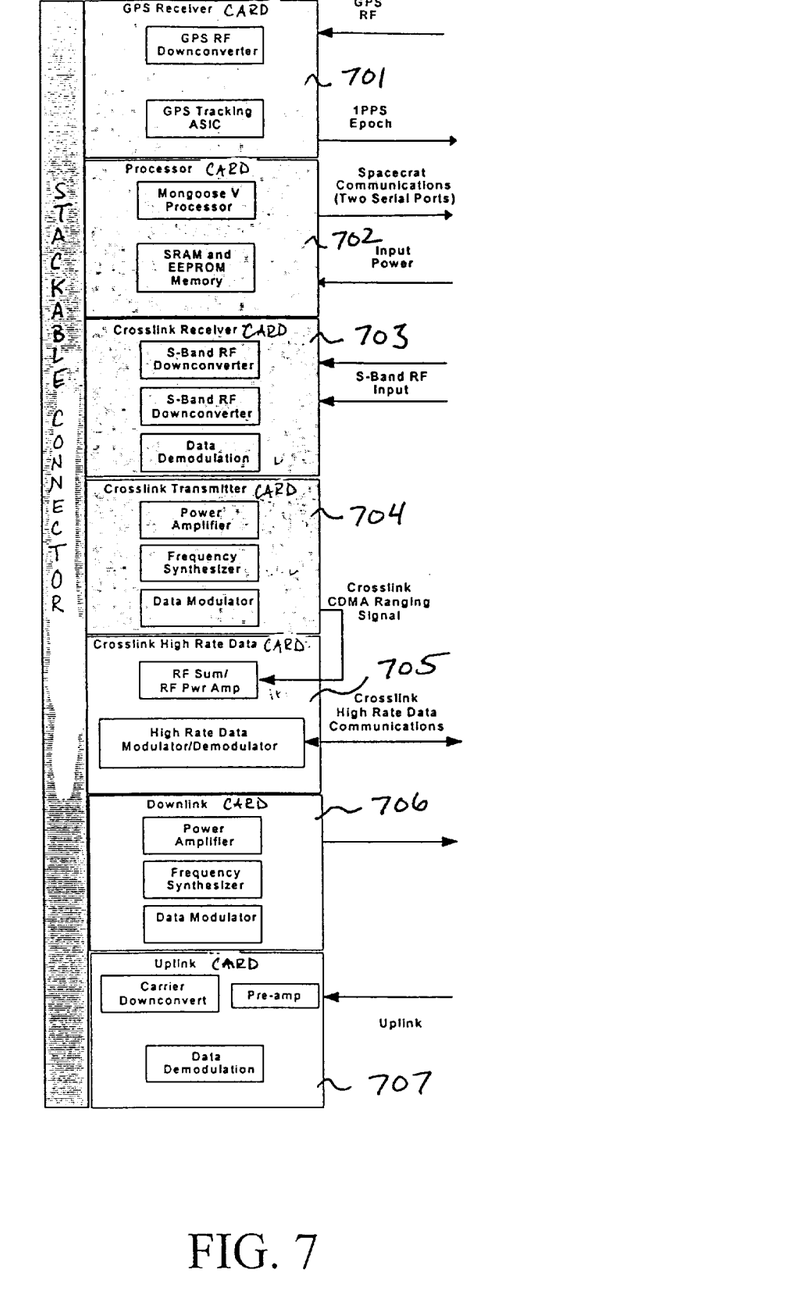
FIG. 7 is a schematic diagram illustrating another embodiment of the present invention.
Figure 9:
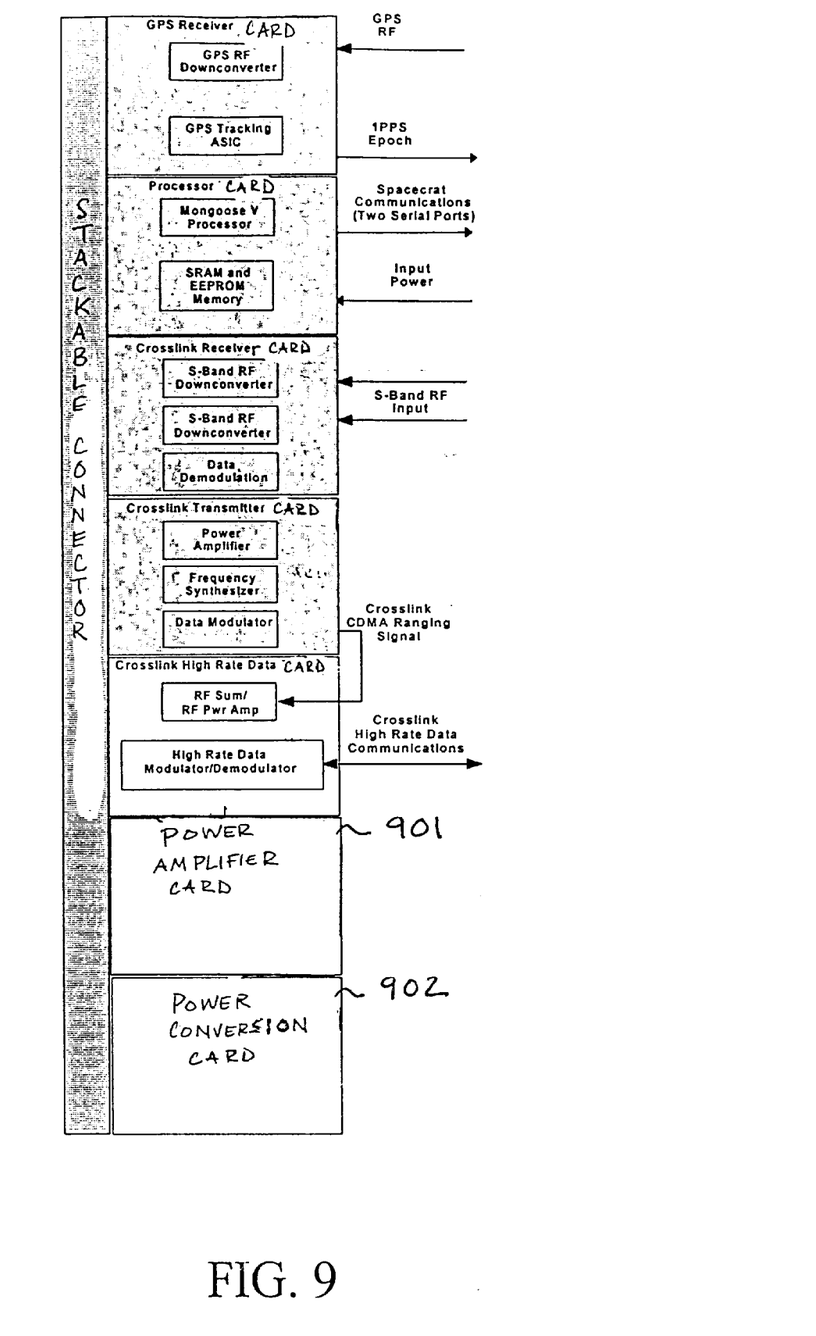
FIG. 9 is a schematic diagram illustrating another embodiment of the present invention.

FIG. 7 and FIG. 9 are diagrams illustrating an alternate embodiment of the present invention. Referring to FIG. 7, a description of possible augmentations to the CLT is described below.

As stated throughout, due to the modularity and scalability of the CLT design, there are several possible augmentations that expand the system's capability as an integrated technology solution for distributed spacecraft systems. Some of these augmentations include adding an uplink card 707, a downlink card 706, and a high data rate (HDR) card 705 to the standard CLT configuration, which includes a GPS receiver card 701, a processor card 702, a crosslink receiver card 703, and a crosslink transmitter card 704. The uplink and downlink card 706 and 707 will enable a spacecraft to receive control information or commands from a control station on Earth. The HDR card 705 enables the CLT to receive high data rate transmissions from other spacecraft in the distributed spacecraft system. The design approach is to build on the modularity of the existing CLT design by implementing these functions as additional cards that would be incorporated into a stand-alone chassis should an application require one of these functions.

In FIG. 9 an alternate embodiment including a power amplifier card 901 and a power conversion card 902 is illustrated.

In another embodiment of the present invention, an HDR channel is implemented as an optional enhancement to the existing CLT communication/ranging channel. Both the ranging channel and the HDR channel use different signal structures modulated onto the same carrier, thereby minimizing hardware. The ranging channel, which supports moderate interspacecraft communications rates, takes advantage of omni-directional antennas to provide a robust link for command and control, relative ranging, formation initialization, and fault recovery with less regard to spacecraft location and attitude. The additional high data rate card 705 can support increased transmit powers to meet the required $C/N_0$ for increased data rates to support science data exchange or distributed processing. Alternatively, high gain antenna arrays can be employed to reduce power needs. Based on dynamic tracking of the formation geometry supplied by the ranging channel, transmit and receive antennas with the highest crosslink antenna gain can be selected to maximize the data link at any given time.

As with the existing crosslink design, variable data rates will be required for any practical implementation of the high data rate channel due to significant gain variations as a function of spacecraft attitude. The high data rate channel dynamically adapts the data rate to maintain the required BER based on knowledge of received $C/N_0$ levels as determined from the ranging channel.

As described above, the CLT is a modular technology solution that enables distributed spacecraft systems by supporting the fundamental functions of navigation, communications, and control. The modularity of the CLT combined with its integrated chassis and advanced stackable connector design provides a technology that is configurable and scalable. This allows the CLT to support broad classes of distributed spacecraft missions.

While the present invention has been described above with reference to a distributed spacecraft system, those skilled in the art may also find the present invention applicable to other non-space systems (e.g., planes, cars, boats, etc.).

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. An integrated navigation and communication system contained within a spacecraft, that enables control operations and science operations in a distributed spacecraft system including multiple spacecrafts, comprising:
    a stackable connector utilized as a system bus;
    at least one processor card;
    at least one GPS receiver card;
    at least one crosslink receiver card for receiving signals from other spacecraft in the distributed spacecraft system; and
    at least one crosslink transmitter card for transmitting signals to the other spacecraft in the distributed spacecraft system;
    wherein the at least one processor card, the at least one GPS receiver card, the at least one crosslink receiver card, and the at least one crosslink transmitter card are in communication with each other by each being connected to the stackable connector.

2. The system as described in claim 1 wherein the at least one crosslink receiver card supports multiple frequency channels.

3. The system as described in claim 1 wherein the stackable connector provides access to a mezzanine memory board that supports multiple memory configurations that are adaptable for a given implementation.

4. The system as described in claim 1 wherein the at least one processor card supports signal acquisition and tracking, navigation, communications, and distributed command and control for the spacecraft.

5. The system as described in claim 1 further comprising at least one heat sink footing to dissipate thermal energy from the system to the spacecraft.

6. The system as described in claim 1 wherein the at least one processor card, the at least one GPS receiver card, the at least one crosslink receiver card, and the at least one crosslink transmitter card are positioned to mitigate EMI.

7. The system as described in claim 1 further comprising isolation plates fixed between the at least one processor card, the at least one GPS receiver card, the at least one crosslink receiver card, and the at least one crosslink transmitter card to mitigate EMI.

8. The system as described in claim 1 wherein the at least one processor card is programmable to a particular application using a field programmable array.

9. The system as described in claim 1 wherein the at least one GPS receiver card provides autonomous orbit determination and navigation based on an extended Kalman filter.

10. The system as described in claim 1 wherein the at least one crosslink receiver card supports at least one of a TDMA mode, a CDMA mode, or a hybrid FDMA/CDMA mode.

11. The system as described in claim 1 wherein the at least one crosslink transmitter card supports at least one of a TDMA mode, a CDMA mode, or a hybrid FDMA/CDMA mode.

12. The system as described in claim 1 wherein the at least one processor card supports adaptive power control to mitigate near-far communication interference.

13. The system as described in claim 1 wherein the at least one processor card supports centralized, hierarchical, and fully distributed command/control architectures.

14. The system as described in claim 1 wherein the at least one processor card supports relative navigation integrated crosslink communication and ranging capabilities.

15. The system as described in claim 1 wherein power, mass, and volume format design is a function of an intended mission.

16. The system as described in claim 1 wherein the stackable connector allows for an implementation of at least one additional card, thereby providing scalability to the system.

17. The system as described in claim 16, wherein an additional card is an uplink communication card, a downlink communication card, a High Data Rate (HDR) card, a power amplifier card, or a power conversion card.

18. The system as described in claim 1 wherein the at least one crosslink receiver card and the at least one crosslink transmitter card perform communication tasks and relative ranging tasks.

19. The system as described in claim 1 wherein the at least one processor card supports autonomous adaptive data rate control to mitigate near-far communication interference.

* * * * *